United States Patent
Avitabile et al.

(10) Patent No.: US 12,380,575 B2
(45) Date of Patent: *Aug. 5, 2025

(54) DEVICE, COMPUTER PROGRAM AND METHOD

(71) Applicants: Sony Group Corporation, Tokyo (JP); Sony Europe B.V., Weybridge (GB)

(72) Inventors: Antonio Avitabile, Basingstoke (GB); Salvatore Finatti, Basingstoke (GB)

(73) Assignees: Sony Group Corporation, Tokyo (JP); Sony Europe B.V., Weybridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,213

(22) Filed: Apr. 11, 2024

(65) Prior Publication Data

US 2024/0257359 A1    Aug. 1, 2024

Related U.S. Application Data

(63) Continuation of application No. 17/189,928, filed on Mar. 2, 2021, now Pat. No. 11,983,887.

(30) Foreign Application Priority Data

Mar. 6, 2020    (GB) ..................... 2003323

(51) Int. Cl.
| | |
|---|---|
| *G06K 9/00* | (2022.01) |
| *G06N 3/02* | (2006.01) |
| *G06T 3/40* | (2006.01) |
| *G06T 7/20* | (2017.01) |
| *G06T 9/00* | (2006.01) |

(52) U.S. Cl.
CPC .............. *G06T 7/20* (2013.01); *G06N 3/02* (2013.01); *G06T 3/40* (2013.01); *G06T 9/00* (2013.01)

(58) Field of Classification Search
CPC ............... G06T 7/0014; G06T 5/50; G06T 2207/10016; G06T 2207/20081; G06T 2207/20084; G06T 2207/30048; G06T 2207/30101; A61B 8/0883; A61B 8/5223;
(Continued)

(56) References Cited

U.S. PATENT DOCUMENTS

| | | | |
|---|---|---|---|
| 6,937,773 B1 | 8/2005 | Nozawa et al. | |
| 8,515,194 B2 | 8/2013 | Srinivasan et al. | |

(Continued)

FOREIGN PATENT DOCUMENTS

| | | |
|---|---|---|
| CN | 110505481 A | 11/2019 |
| EP | 0537958 A2 | 4/1993 |

(Continued)

*Primary Examiner* — Xin Jia
(74) *Attorney, Agent, or Firm* — Oblon, McClelland, Maier & Neustadt, L.L.P.

(57) ABSTRACT

A method comprising the steps of: receiving an image from a dynamic vision sensor and an image from an image sensor, wherein the dynamic vision sensor and the image sensor capture at least an overlapping field of view; determining, from the image received from the dynamic vision sensor, an area of movement in the field of view of the image from the image sensor; applying a higher level of image compression to the areas of no movement compared with the area of movement in the image from the image sensor to produce a processed image; and outputting the processed image to a neural network.

20 Claims, 15 Drawing Sheets

(58) Field of Classification Search
CPC .. G06V 10/762; G06V 10/764; G06V 10/774; G06V 10/82; G16H 50/20
See application file for complete search history.

(56) References Cited

U.S. PATENT DOCUMENTS

| | | |
|---|---|---|
| 2005/0232502 A1 | 10/2005 | Fukushima et al. |
| 2012/0275718 A1 | 11/2012 | Takamori et al. |
| 2018/0188372 A1 | 7/2018 | Wheeler |
| 2018/0213260 A1 | 7/2018 | Mantler |
| 2019/0356849 A1* | 11/2019 | Sapienza ............... G06V 20/10 |

FOREIGN PATENT DOCUMENTS

| | | | |
|---|---|---|---|
| JP | 2008048243 A | * | 2/2008 |
| JP | 2018142299 A | | 9/2018 |
| WO | WO 2020/034078 A1 | | 2/2020 |

* cited by examiner

DEVICE, COMPUTER PROGRAM AND METHOD

CROSS-REFERENCE TO RELATED APPLICATIONS

This document is a continuation application of and is based upon and claims the benefit of priority under 35 U.S.C. § 120 from pending application U.S. Ser. No. 17/189,928, filed Mar. 2, 2021, which claims the benefit of priority under 35 U.S.C. § 119 from the United Kingdom Patent Application No. 2003323.9, filed Mar. 6, 2020.

BACKGROUND

Field of the Disclosure

The present technique relates to a device, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

As the use of Neural Networks is increasingly being used in various technologies, there is an increased need for the classification probability output by the Neural Network to be both more accurate and output more quickly. This is especially important in image systems used in safety critical system such as fully autonomous and partially autonomous vehicles. In these types of systems, the classification probability output by the Neural Network must be very accurate to ensure the likelihood of making the incorrect decision is reduced. Moreover, given that the Neural Networks are in systems that operate in real-time, with obstacles that move relative to the vehicle, the decisions have to be made quickly.

It is an aim of the disclosure to address one or more of these issues.

SUMMARY

According to embodiments of the disclosure, there is provided a method comprising the steps of: receiving an image from a dynamic vision sensor and an image from an image sensor, wherein the dynamic vision sensor and the image sensor capture at least an overlapping field of view; determining, from the image received from the dynamic vision sensor, an area of movement in the field of view of the image from the image sensor; applying a higher level of image compression to the areas of no movement compared with the area of movement in the image from the image sensor to produce a processed image; and outputting the processed image to a neural network.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3-2A to 3-2D show representative images captured by the Dynamic Vision Sensor in the system 100 explaining embodiments of the disclosure;

DESCRIPTION OF THE EMBODIMENTS

Figure 1:
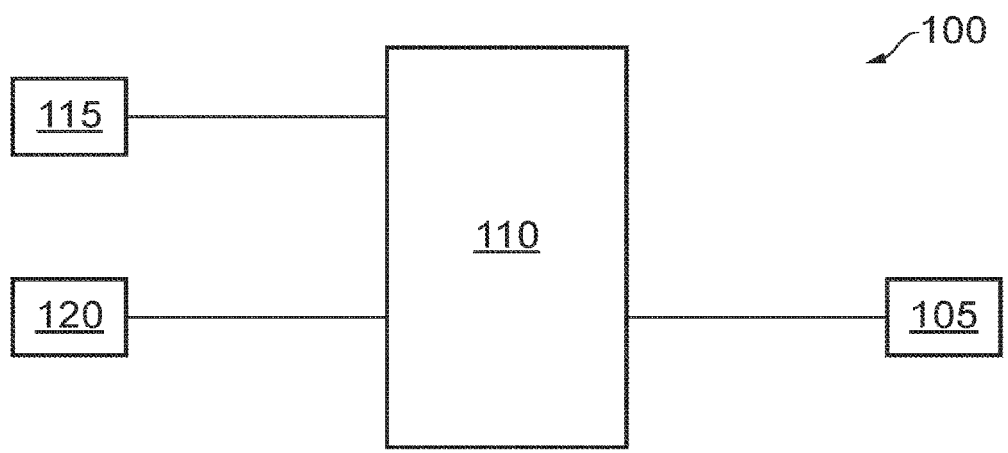
FIG. 1 shows a system 100 according to embodiments of the present disclosure.

Referring now to the drawings, wherein like reference numerals designate identical or corresponding parts throughout the several views.

FIG. 1 shows a system 100 according to embodiments of the present disclosure. The system 100 includes a Dynamic Vision Sensor (DVS) 115, an image sensor 120, a device 110 and a machine learning algorithm 105. In the system 100 of FIG. 1, the DVS 115 and the image sensor 120 are connected to the device 110 and provide one or more images of the same field of view to the device 110. The device 110 processes the images as will be explained and outputs a compressed image to the machine learning algorithm 105. The machine learning algorithm 105 uses the compressed image to classify the elements within the compressed image with an improved accuracy and more quickly. In embodiments, the machine learning algorithm 105 is used to determine pedestrians in autonomous or partially autonomous vehicles for example. Of course, the disclosure is not so limited and the machine learning algorithm 105 may be any machine learning algorithm.

As noted above, the system 100 includes a Dynamic Vision Sensor (DVS) 115 and an image sensor 120. As would be appreciated, a DVS 115 is a known sensor that determines areas of movement in a captured video stream. In other words, the DVS 115 captures a video stream of its field of view and determines any areas of movement within the video stream. One example of a DVS 115 is a SEES Dynamic Vision Sensor produced by Insightness®, a Sony group company, although the disclosure is not so limited and any image sensor having DVS capability is envisaged.

With regard to the image sensor 120, in embodiments, the image sensor 120 is an Active Pixel Image Sensor. These types of image sensor are known and each pixel sensor unit cell has a photodetector and one or more active transistors. The output from an Active Pixel Image Sensor is an RGB image of its field of view. One example of an image sensor 120 is an IMX304LLR produced by Sony Corporation® although the disclosure is not so limited and any image sensor is envisaged.

It should be understood that in embodiments of the present disclosure, the field of view of the DVS 115 and the image sensor 120 is, in embodiments, the same. In other words, an area of movement at a pixel position within the overlapping field of view determined by the DVS 115 will occur at the same (or similar) pixel position (Region of Interest) and optionally time (Time of Interest) within the image sensor 120. This combination of Region of Interest and Time of Interest has the additional advantage of a more accurate trigger. In that regard, although the DVS 115 and the image sensor 120 are shown in FIG. 1 as being separate image sensors, in embodiments, the DVS 115 and the image sensor 120 may be integrated onto the same semiconductor die (i.e. within the same semiconductor package) or may be two separate image sensors located within the same housing. This is advantageous because any movement applied to one image sensor will equally apply to the other image sensor. This maintains at least an overlapping field of view between the DVS 115 and the image sensor 120 more easily.

Of course, although the above embodiment discusses the field of view of the DVS 115 and the image sensor 120 being the same, the disclosure is not so limited. The field of view of the DVS 115 and the image sensor 120 may at least overlap. In this case, there will be a mapping between the pixel position in the DVS 115 and the corresponding pixel position with the image sensor 120. In other words, a particular pixel in the DVS 115 will have a corresponding pixel in the image sensor 120.

The device 110 will be now described with reference to FIG. 2.

Figure 2:
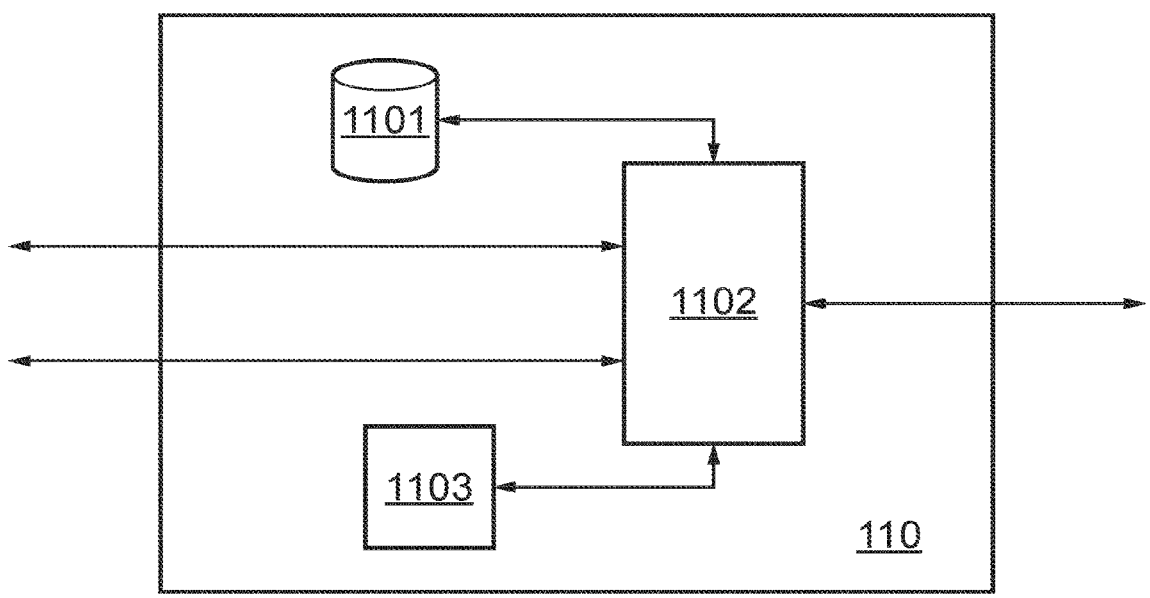
FIG. 2 shows a device 110 according to embodiments of the present disclosure which forms part of the system of FIG. 1.

Referring to FIG. 2, the device 110 according to embodiments is shown. The device 110 includes processing circuitry 1102. The processing circuitry 1102 may be any kind of circuitry that performs steps according to embodiments of the disclosure. For example, the processing circuitry 1102 may be an Application Specific Integrated Circuit (ASIC) or a microprocessor that operates under the control of a computer program (or computer software) to perform steps according to embodiments of the disclosure.

The processing circuitry 1102 is connected to the DVS 115 and the image sensor 120. This connection may be a wired or wireless connection. The purpose of the connection is to receive an image from both the DVS 115 and the image sensor 120. As noted above, the DVS 115 and image sensor 120 both have the same field of view in embodiments of the disclosure.

Additionally connected to the processing circuitry 1102 is storage 1101. The storage may be any kind of storage capable of storing the computer program or computer software which is run on the processing circuitry 1102 to control the processing circuitry 1102 to perform a method according to embodiments of the disclosure. The storage 1101 may store images from one or both of the DVS 115 and the image sensor 120. In embodiments, the storage 1101 may be solid state storage such as semiconductor storage or magnetically or optically readable storage. Although the storage 1101 is shown as being included in the device 110, the disclosure is not so limited and the storage 1101 may be located remotely to the device 110 such as over a network such as a Local Area Network or the Internet or the like.

Additionally connected to the processing circuitry 1102 is one or more position sensor 1103. The purpose of the position sensor is to determine the position, attitude, speed and/or orientation of the image sensor 120 and/or the DVS 115. This means that the position sensor 1103 communicates with both the DVS sensor 115 and the image sensor 120. It will be appreciated, of course, that if the DVS sensor 115 and the image sensor 120 are located on the same semiconductor die then the position sensor 1103 will need to communicate with only one of the DVS sensor 115 and the image sensor 120.

As will be explained later, the device 110 is configured to use the movement information provided by the image captured by the DVS 115 to determine the areas within the image sequence (video stream) captured by the image sensor 120 where movement takes place. This is possible because the DVS 115 and the image sensor 120 have a correspondence between pixels within each of the DVS 115 and the image sensor 120. In other words, the processing circuitry 1102 knows a mapping between each pixel within the DVS 115 and a corresponding pixel within the image sensor 120. In embodiments, this mapping occurs because the DVS 115 and the image sensor 120 capture the same or at least overlapping field of view.

The processing circuitry 1102 then applies a compression algorithm to the areas of non-movement in the image received from the image sensor 120. This compression algorithm applies a higher level of compression than that applied to the areas of movement in the image received from the image sensor 120. In some embodiments, no compression is applied to the areas of movement in the image received from the image sensor 120. In embodiments, this difference in compression is achieved by having higher dynamic binning being applied to pixels located in areas of movement compared to that applied to areas of non-movement. For example, dynamic binning may be applied to a RAW image captured by the image sensor 120. In embodiments, for areas of non-movement, a higher or maximum level of compression may be applied to a lossy compression format such as JPEG or lossless compression format such as PNG or any High Efficiency Image File Format. In areas of the image that are moving, a smaller amount of compression (or no compression at all) is applied to that area.

In embodiments, the amount of movement in an area may be determined (i.e. not just whether movement occurs). In this case, if the amount of movement in that area is below a threshold, then there is no increase in the amount of compression applied to that area. In other embodiments, the level of compression increases depending upon the amount of decrease in the level of movement within that area.

By selectively applying compression in this manner, a higher level of compression is applied to areas of non-movement compared to areas of movement. This means that the data loss in areas of movement is much less than in areas of non-movement. This is useful because the areas of movement are typically most relevant to determining a classification probability output by the Neural Network. However, by selectively compressing the image as described, the size of the compressed image is reduced. In other words, the amount of data passed between the device 110 and the machine learning algorithm 105 is reduced. The compressed image is provided to the machine learning algorithm 105. However, importantly, by applying less compression to the areas of movement compared to the areas of no movement, a higher signal to noise ratio for the areas of movement is achieved. This lowers the maximum pixel deviation which provides a better contrast ratio in the compressed image fed into the machine learning algorithm 105. The compressed image therefore results in a higher accuracy in classification performed by the machine learning algorithm 105. Moreover, by reducing the size of the image passed to the machine learning algorithm 105, the time taken for classification to occur is reduced. In other words, the speed at which classification occurs is increased.

Figures 1A, 3:
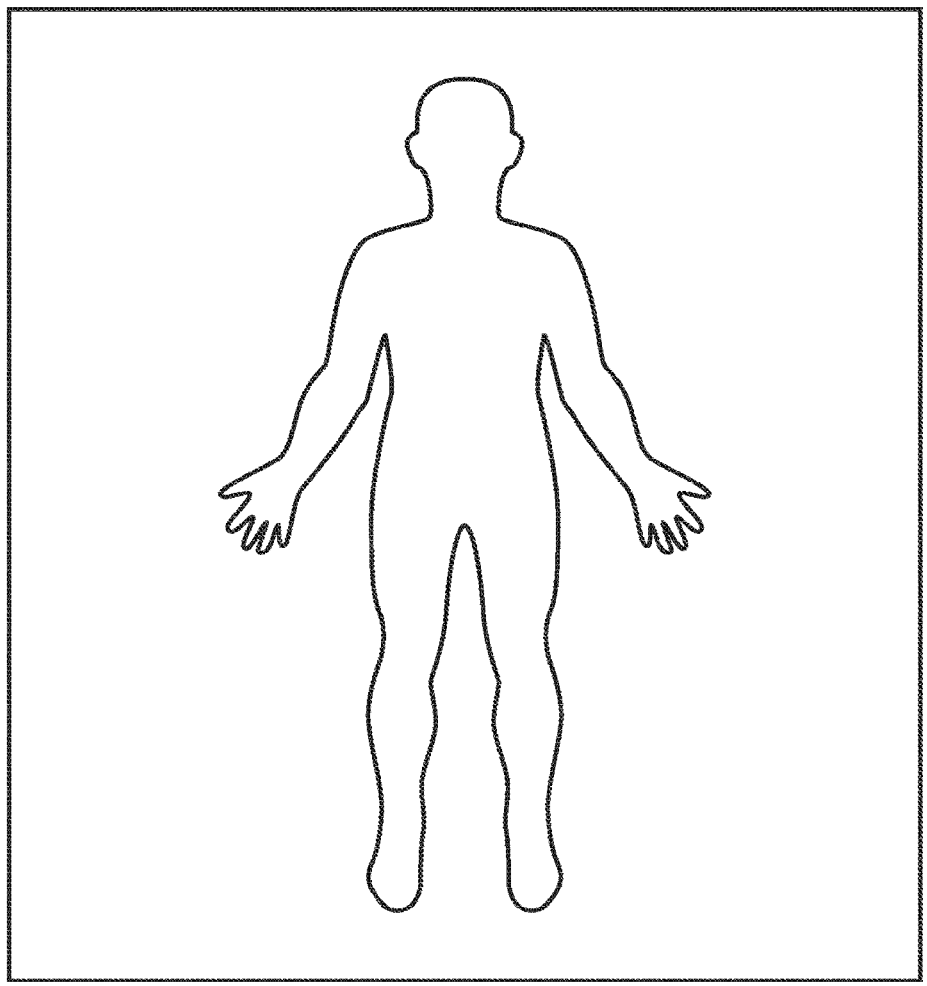
FIGS. 3-1A to 3-1D show representative images captured by the image sensor in the system 100 explaining embodiments of the disclosure.
Figures 1B, 3:
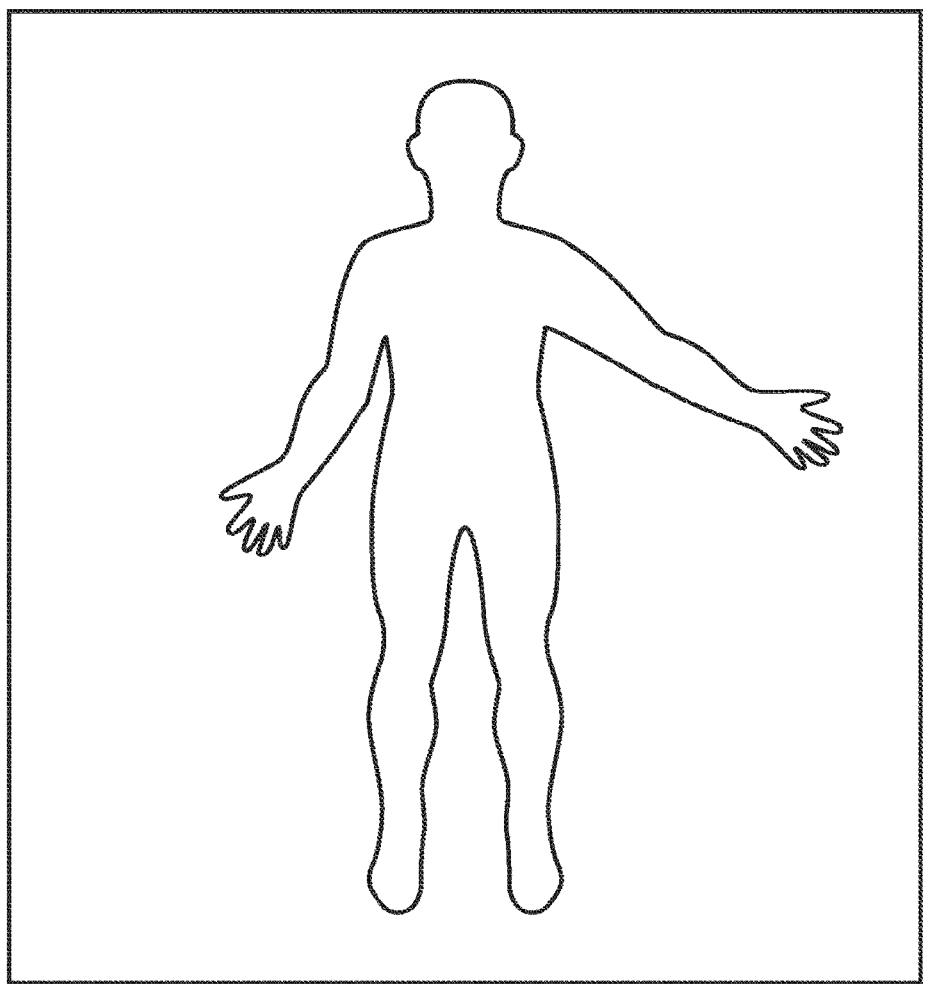
Figures 1C, 3:
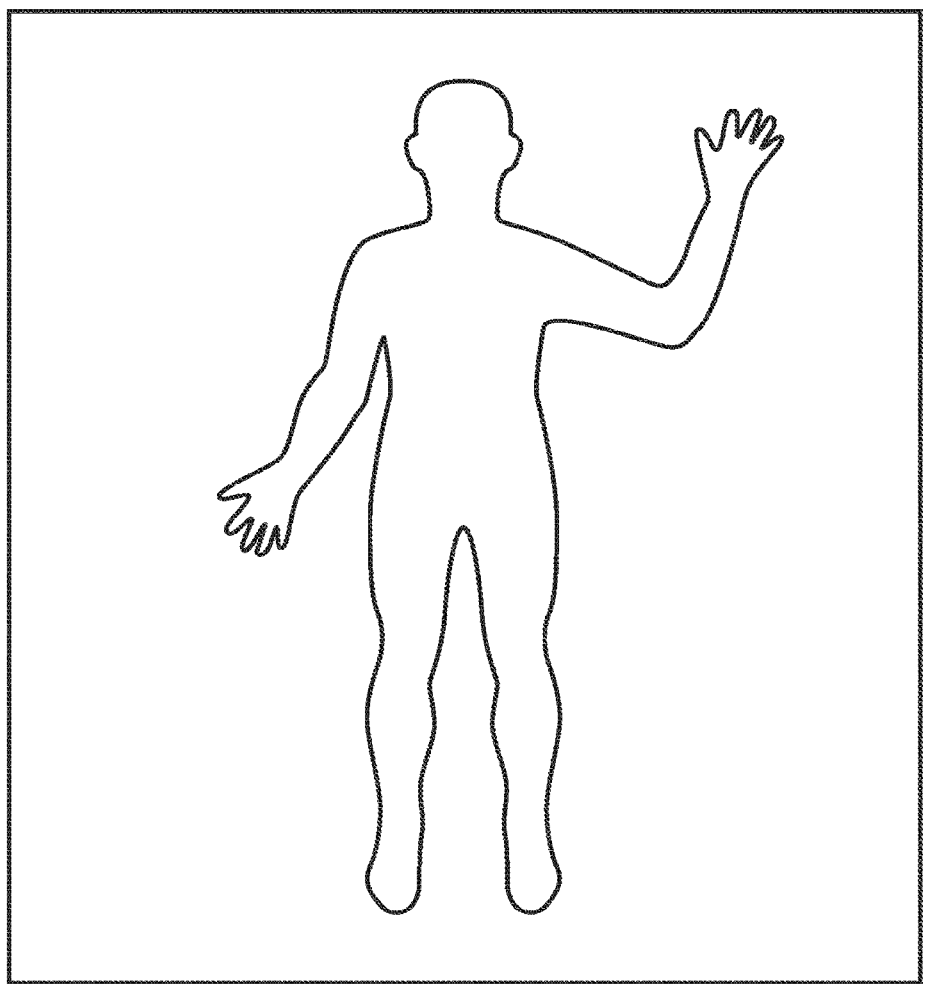
Figures 1D, 3:
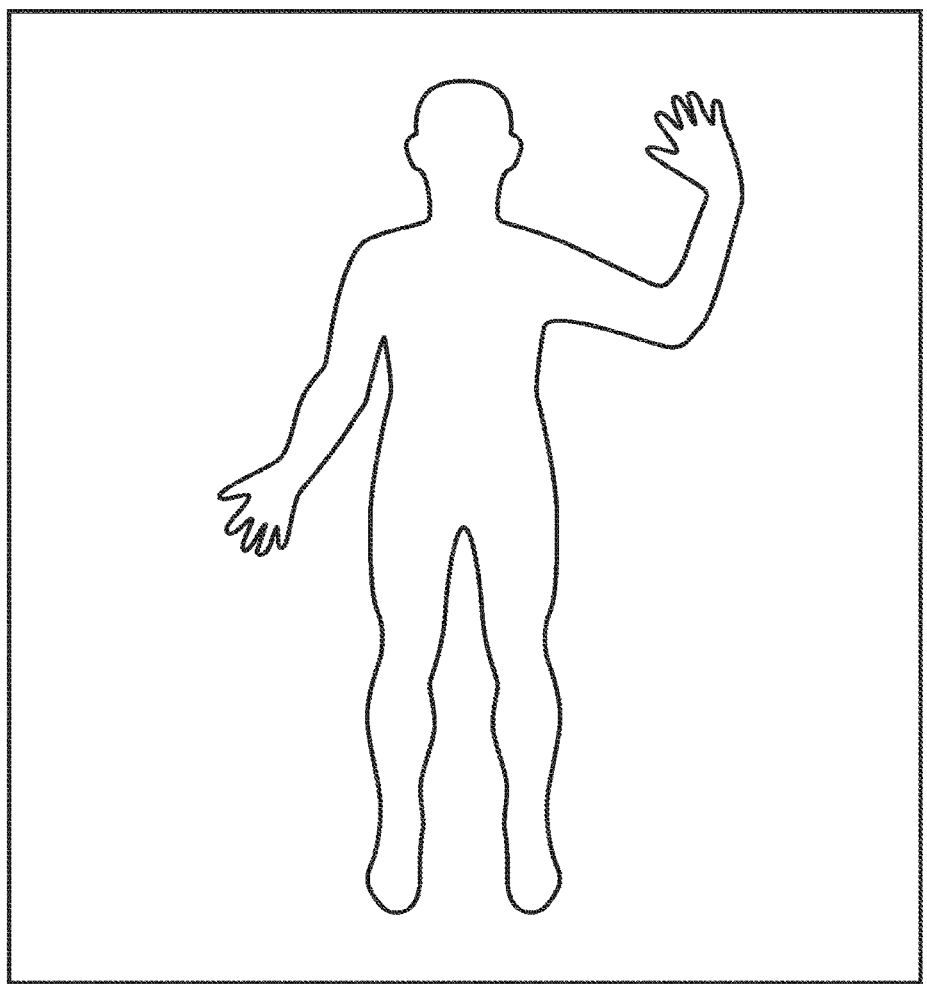
Figures 2A, 3:
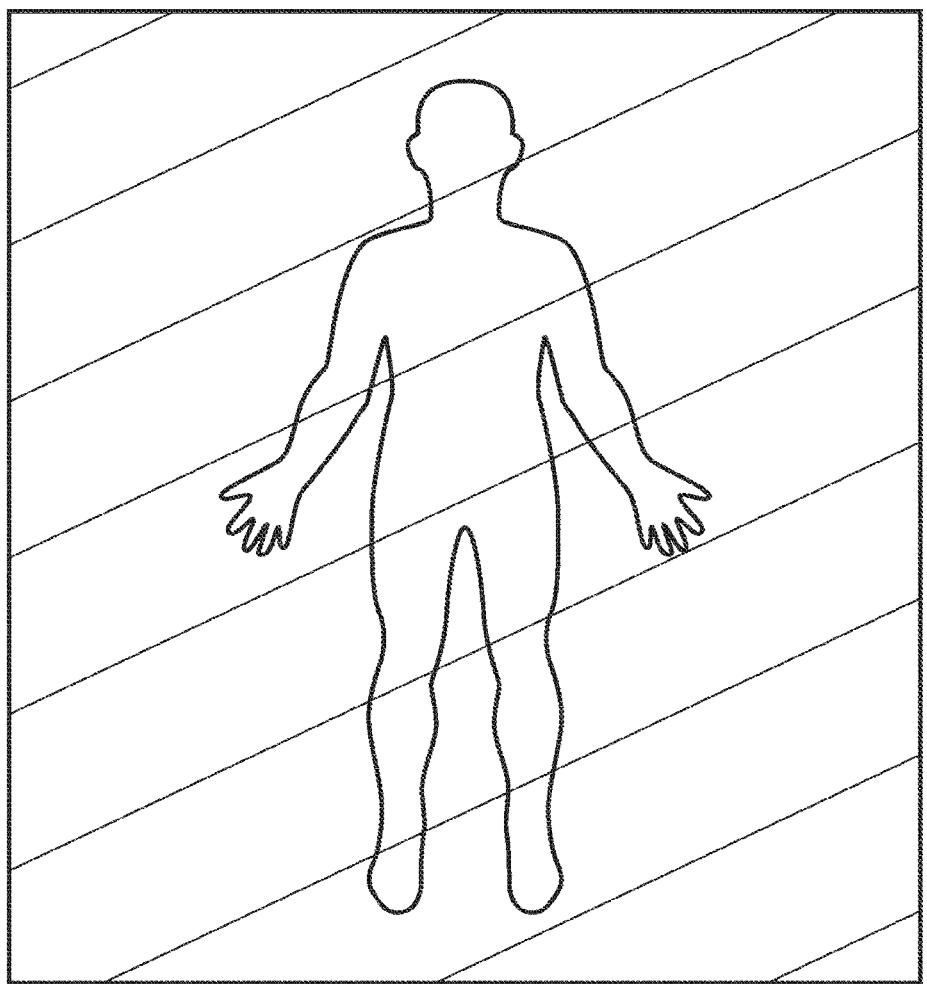
Figures 2B, 3:
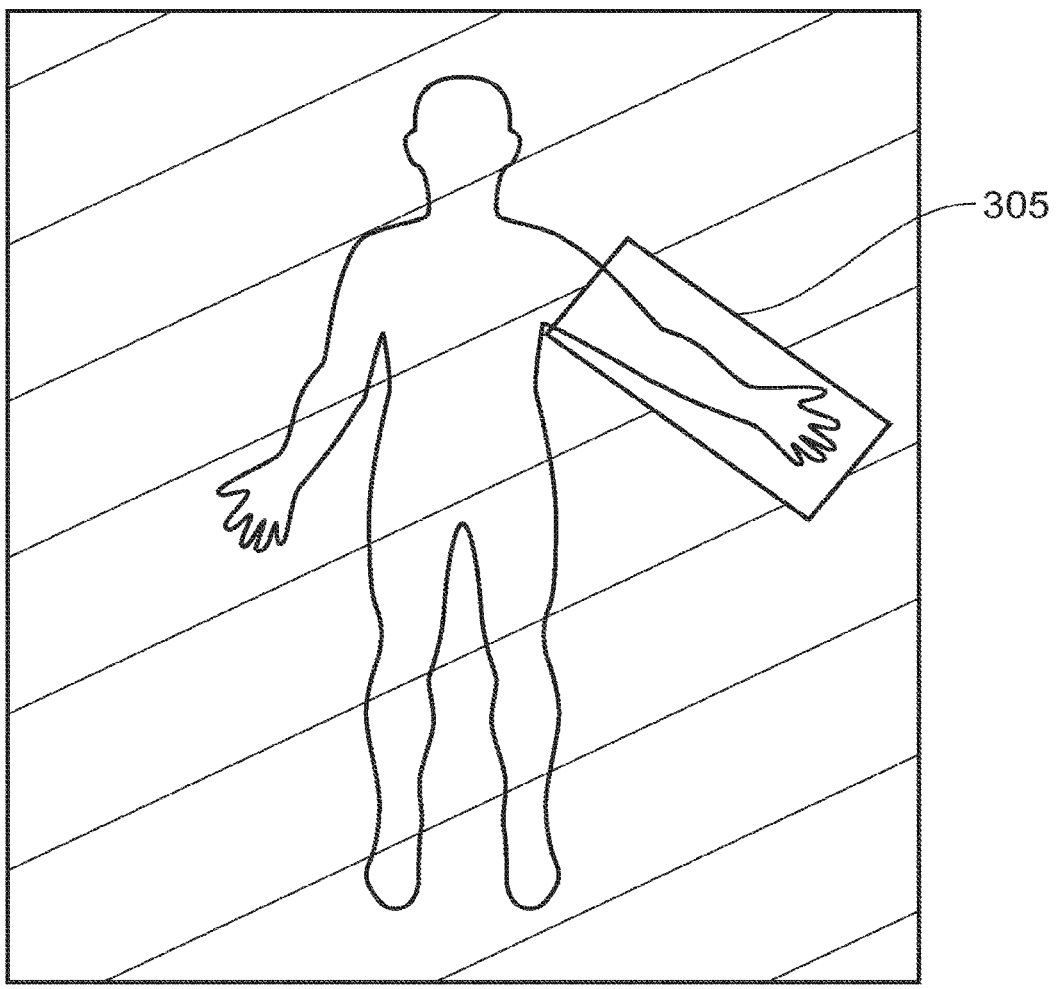
Figures 2C, 3:
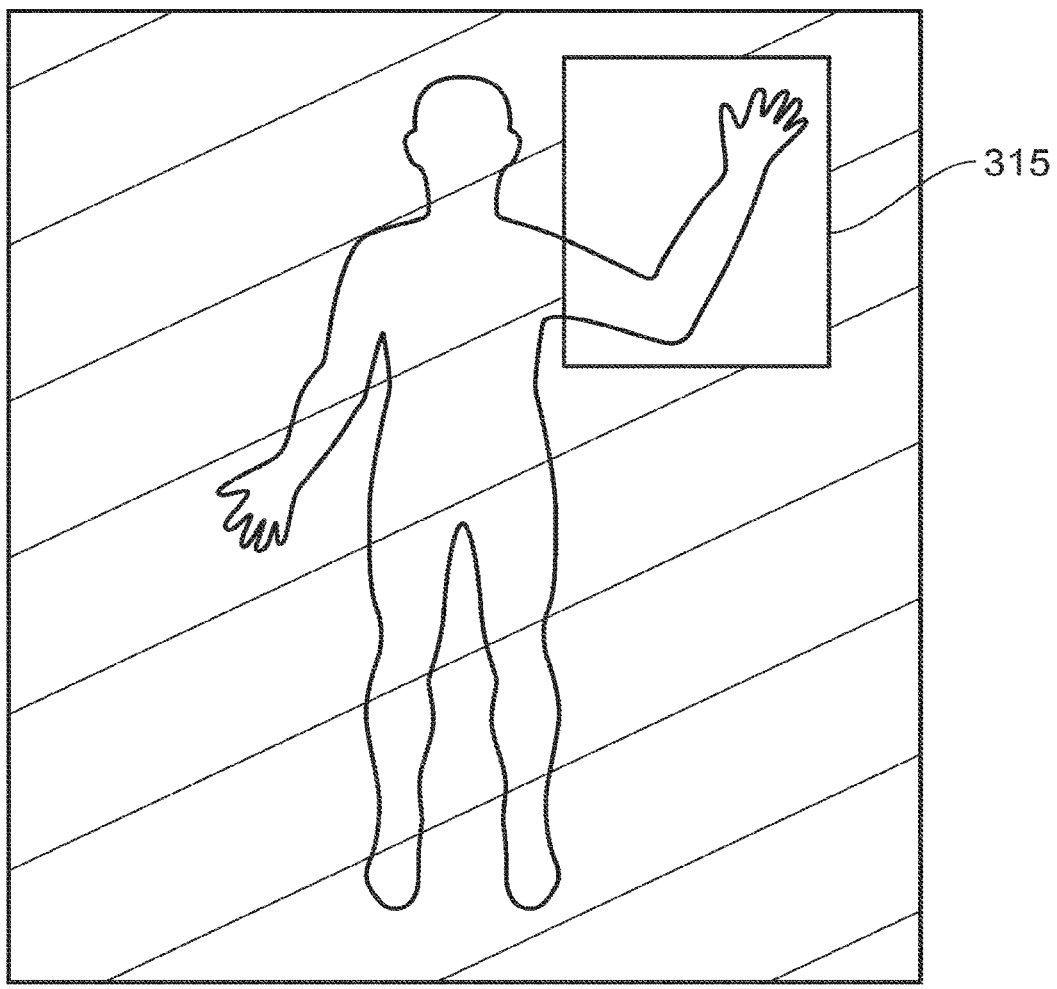
Figures 2D, 3:
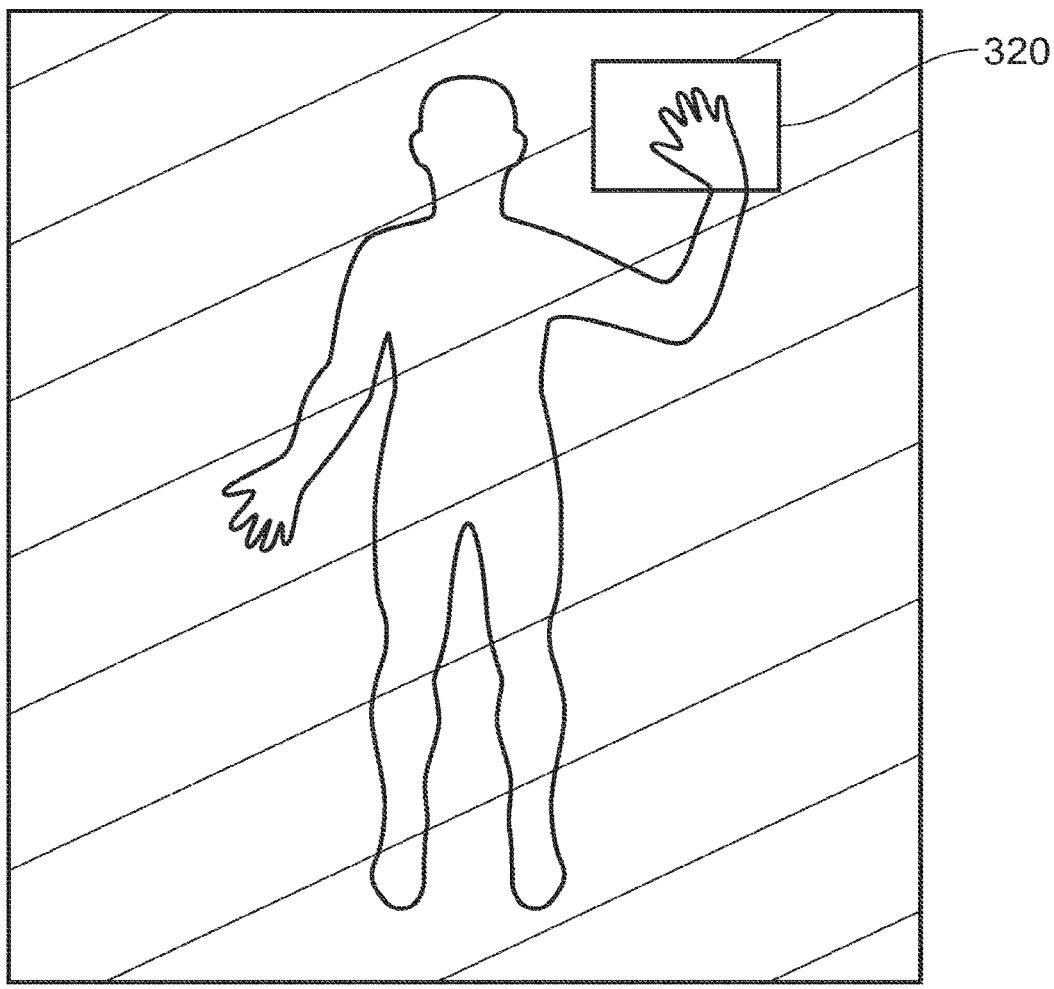

FIGS. 3-1A to 3-1D show representative images captured by the image sensor in the system 100 explaining embodiments of the disclosure. FIGS. 3-2A to 3-2D show representative images captured by the Dynamic Vision Sensor in the system 100 explaining embodiments of the disclosure and FIGS. 4A to 4D show representative images output from the device 110 according to embodiments of the disclosure.

An image of a person is captured by both the DVS 115 and the image sensor 120. This is because the DVS 115 and the image sensor 120 both have the same field of view and so the image captured by the DVS 115 is the same as that captured by the image sensor 120. This image is captured at time, t=0. The image captured by the image sensor 120 is shown in FIG. 3-1A and the image captured by the DVS 115 is shown in FIG. 3-2A.

As will be appreciated by the skilled person, the output from the DVS 115 is a binary image indicating movement in the image. In particular, the output image from the DVS 115 will be black where there is no movement detected and white where there is movement detected. As there is no movement in this image compared to the previous image in the image sequence (video stream), no areas of movement have been identified by the DVS 115. This means that the output from the DVS 115 is completely black. This is shown in FIG. 3-2A as hatched lines. Of course, the disclosure is not so limited and the colour representation shown above is only illustrative and so not limiting.

As noted above, the level of image compression applied to the image from the image sensor 120 is at a higher level for areas of no movement compared with the area of movement in the image from the image sensor. Therefore, the entire image from the image sensor 120 at time, t=0 has the same level of compression applied to the entire image because no movement is detected by the DVS 115. Accordingly, with reference to FIG. 4A, the output image 310 having the same level of compression across the whole image is output to the machine learning algorithm 105.

At time, t=2, another image subsequent to that at time t=1 is captured. For example, this subsequent image may be captured as a next frame in a video stream. Referring now to FIG. 3-1C, an image of the person captured by the image sensor 120 is shown. As the person has moved their arm between time t=1 and time t=2, the DVS 115 image identifies region 315 as being an area of movement. The device 110 determines the region of movement from the image provided by the DVS 115. As noted before, in some embodiments, the DVS 115 may send the entire binary image (that is the image with only black and white areas) to allow the processing circuitry 1102 within the device 110 to determine the region of movement. In embodiments, the DVS 115 may send only the pixel positions of the region of movement rather than the entire image to allow the processing circuitry 1102 within the device 110 to determine the region of movement. For example, the pixel position of the four corners of the region 305 may be sent to the device 110. This reduces the amount of information being provided between the DVS 115 and the device 110.

As there is a mapping between the pixel position of the region of movement in the image provided by the DVS 115 and the image provided by the image sensor 120, the device 110 determines the area of movement in the image provided by the image sensor 120. As noted before, in embodiments, this mapping is provided because the field of view of the DVS 115 and the image sensor 120 are the same, although the disclosure is not so limited.

The device 110 then applies compression to the area of no movement within the image provided by the image sensor 120. Again, the compression applied to the area of no movement within the image is higher than any compression applied to the area of movement within the image. As noted above, in embodiments, no compression is applied to the area of movement within the image. In other embodiments, compression is applied to the area of movement within the image. However, the level of compression applied to the area of no movement within the image is higher than the compression applied to the area of movement within the image.

Figure 4A:
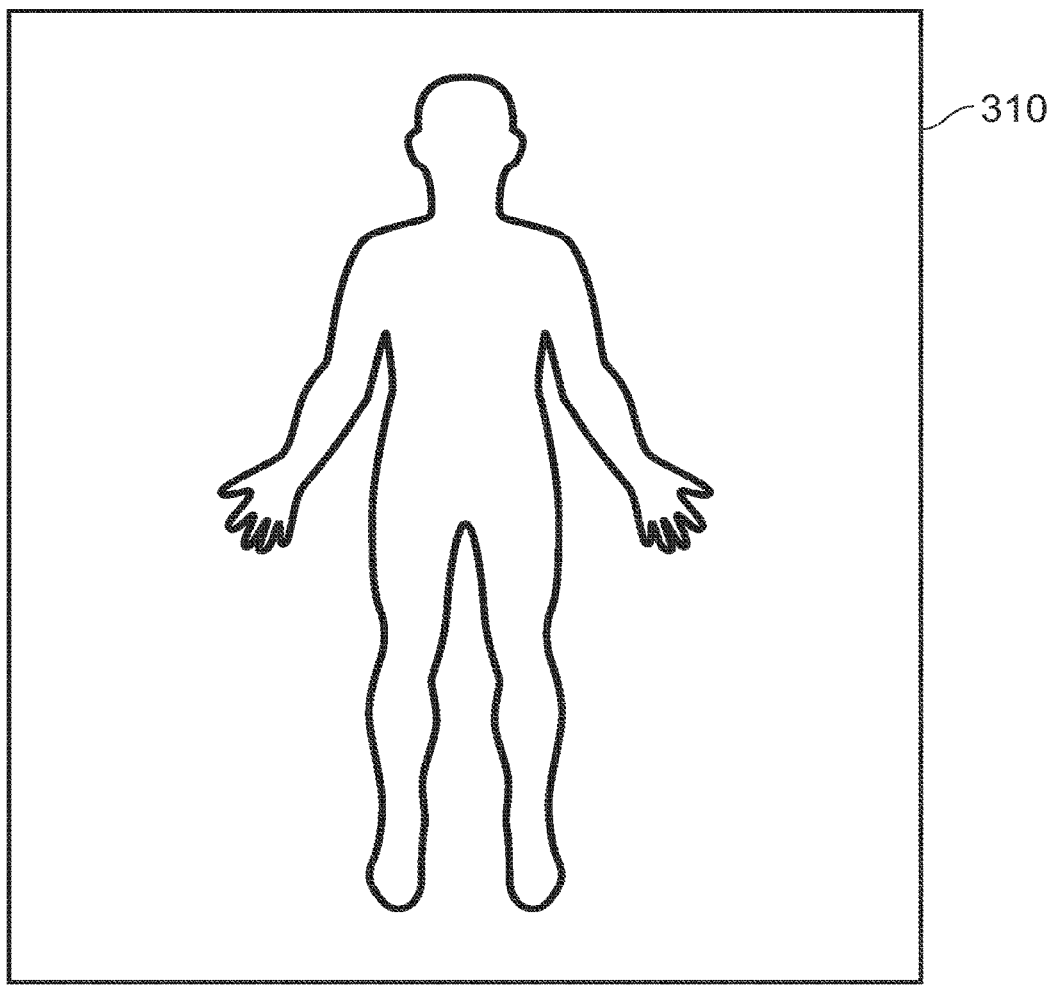
FIGS. 4A to 4D show representative images output from the device 110 according to embodiments of the disclosure.
Figure 4B:
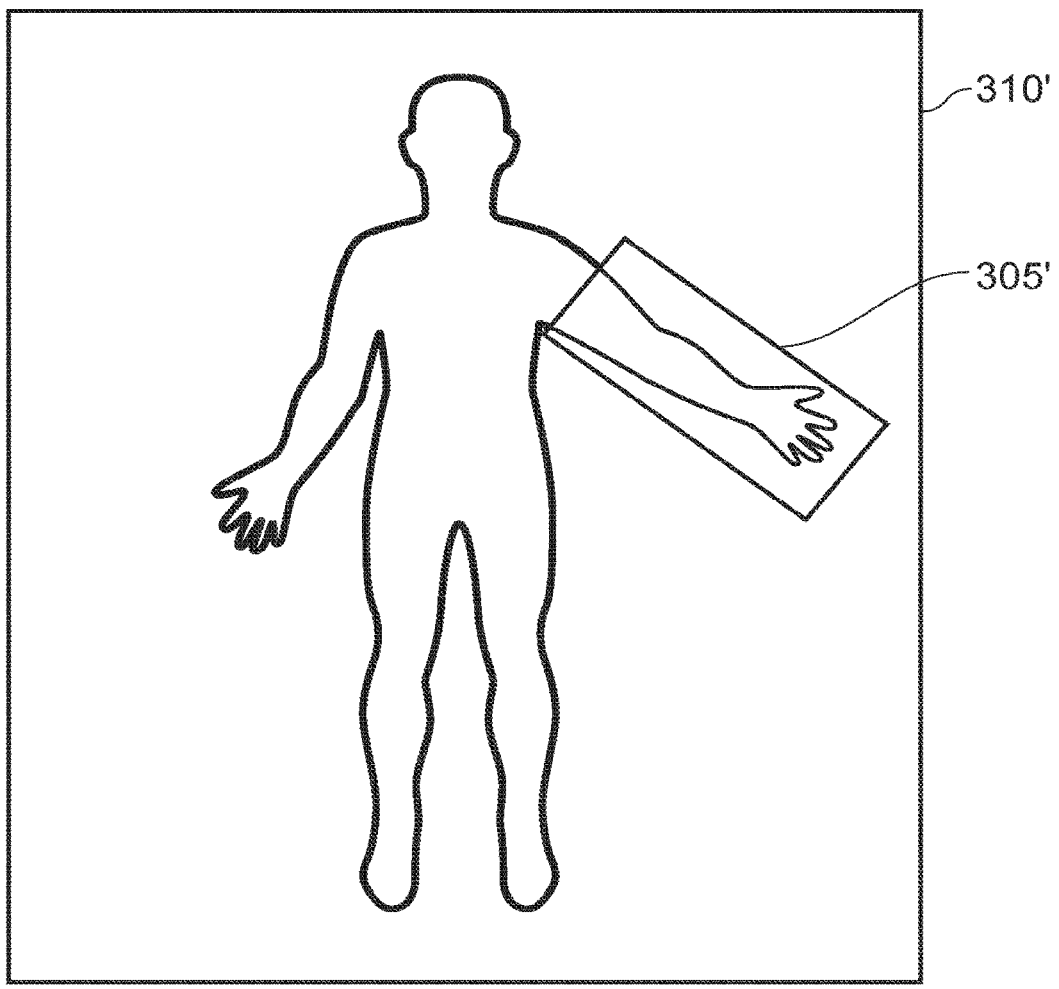
Figure 4C:
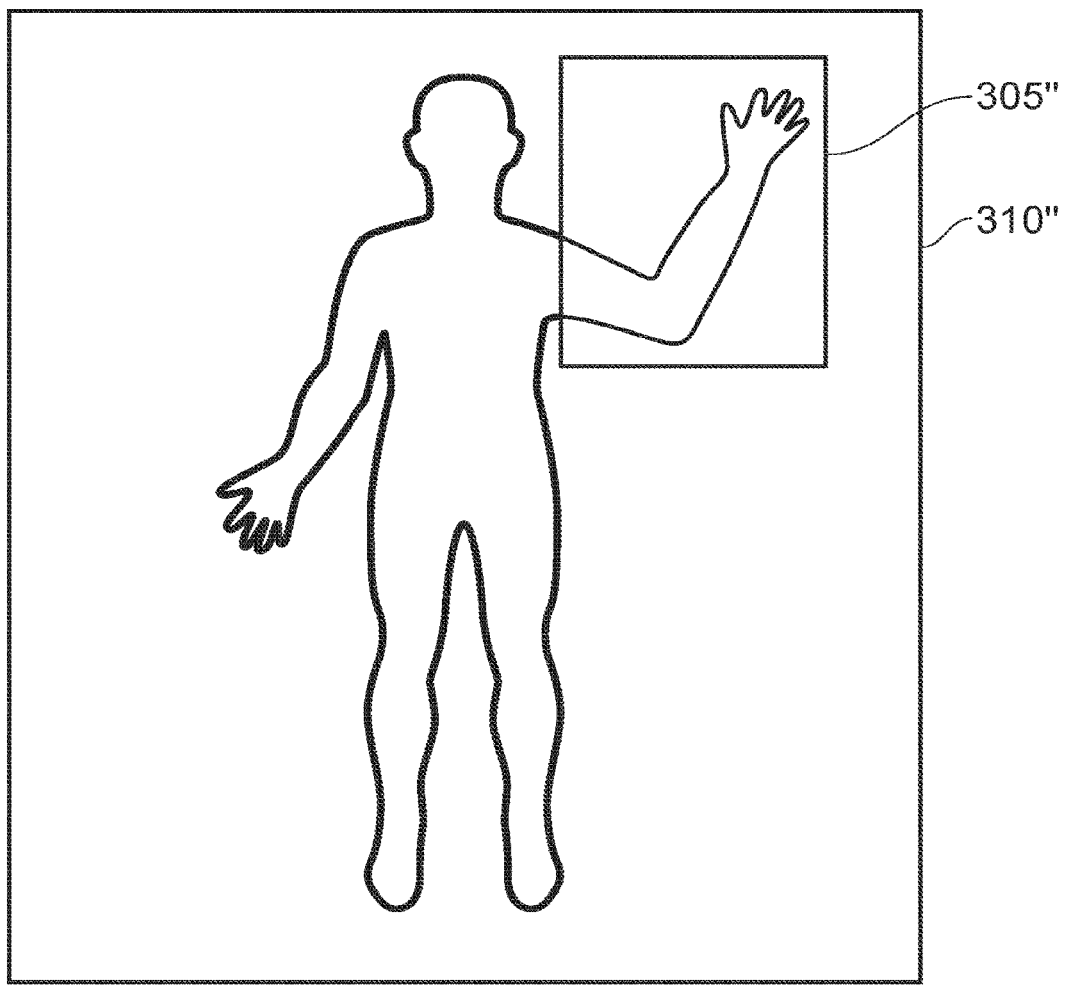

This is shown pictorially in FIG. 4C where the output of the device 110 is shown. Specifically, the amount of compression applied to the region of no movement in the image from the image sensor 120 is higher than the compression applied to the region of movement in the image from the image sensor 120. In particular, in region 305" has less compression applied to it. The compressed image 310" produced by the device 110 is then output to the machine learning algorithm 105.

At time, t=3, another image subsequent to that at time t=2 is captured. For example, this subsequent image may be captured as a next frame in a video stream. Referring now to FIG. 3-1D, an image of the person captured by the image sensor 120 is shown. As the person has moved their arm between time t=2 and time t=3, the DVS 115 image identifies region 320 as being an area of movement. The device 110 determines the region of movement from the image provided by the DVS 115. As noted before, in some embodiments, the DVS 115 may send the entire binary image to allow the device to determine the region of movement. In embodiments, the DVS 115 may send only the pixel positions of the region of movement rather than the entire image to allow the device to determine the region of movement. For example, the pixel position of the four corners of the region 305 may be sent to the device 110. This reduces the amount of information being provided between the DVS 115 and the device 110.

As there is a mapping between the pixel position of the region of movement in the image provided by the DVS 115 and the image provided by the image sensor 120, the device 110 determines the area of movement in the image provided by the image sensor 120. As noted before, in embodiments, this mapping is provided because the field of view of the DVS 115 and the image sensor 120 are the same, although the disclosure is not so limited.

The device 110 then applies compression to the area of no movement within the image provided by the image sensor 120. Again, the compression applied to the area of no movement within the image is higher than any compression applied to the area of movement within the image. As noted above, in embodiments, no compression is applied to the area of movement within the image. In other embodiments, compression is applied to the area of movement within the image. However, the level of compression applied to the area of no movement within the image is higher than the compression applied to the area of movement within the image.

Figure 4D:
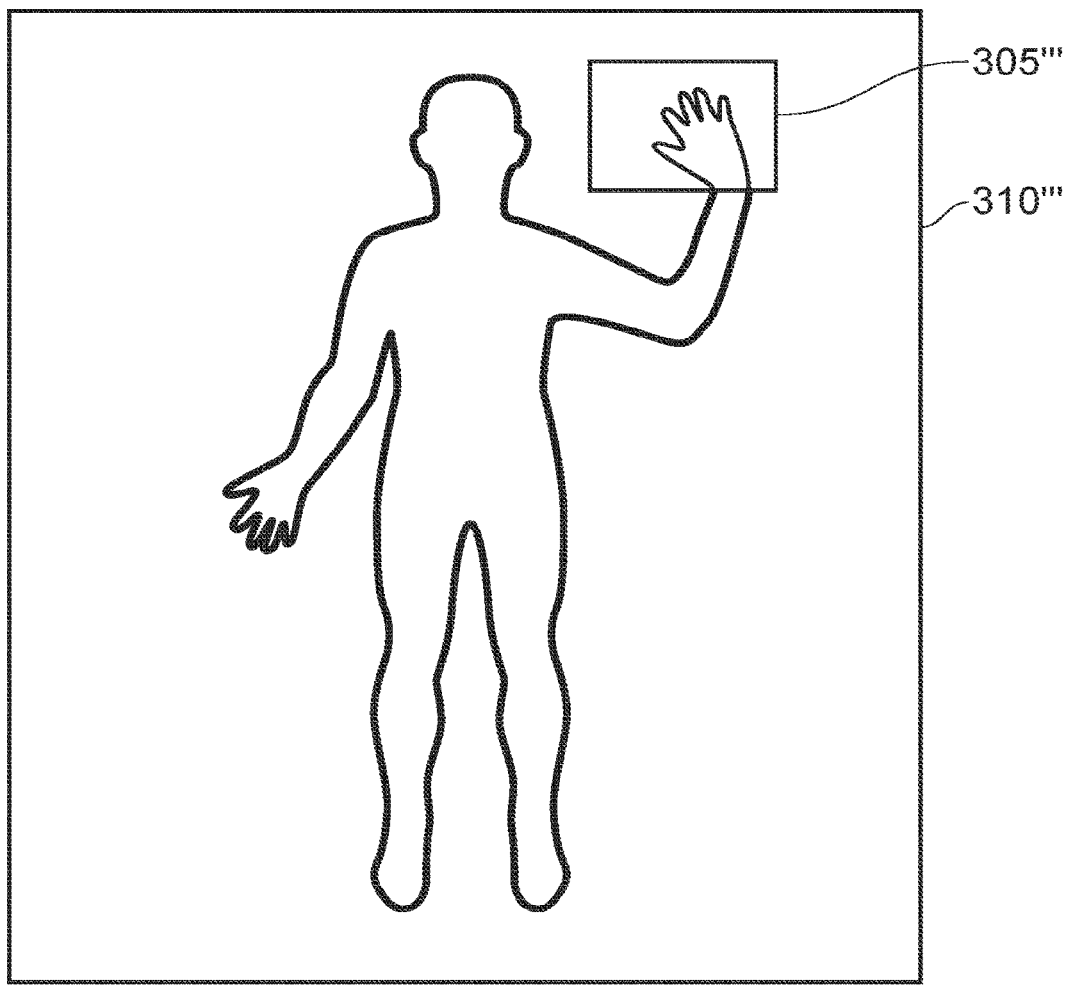

This is shown pictorially in FIG. 4D where the output of the device 110 is shown. Specifically, the amount of compression applied to the region of no movement in the image from the image sensor 120 is higher than the compression applied to the region of movement in the image from the image sensor 120. In particular, in region 305''' has less compression applied to it. The compressed image 310''' produced by the device 110 is then output to the machine learning algorithm 105.

As noted above, in embodiments of the disclosure, the system 100 is incorporated in a vehicle. For example, the system 100 may be included in a car, truck, motorcycle or the like. In this instance, the system 100 may be subject to motion of the vehicle. Of course, the system 100 may be subject to movement in other scenarios such as if the system 100 is located on a person or the like.

In the instance that the system 100 is moving relative to its surroundings, the movement which affects the image captured by the DVS 115 and the image sensor 120 may be due to the movement of the system 100 rather than the movement of the subject within the image being captured. For example, if the subject was a person walking down a street, in the event that the system 100 was stationary, the person would move relative to the system 100 as they walked down the street. However, in the event that the system 100 moved, the person may be stationary but as there is relative movement between the system 100 and the person, the system 100 would detect a relative movement between the person and the system 100. This would result in the DVS 115 incorrectly indicating movement of the person.

In order to reduce the likelihood of this situation arising, according to embodiments, the position sensor 1103 is used as will be explained. As noted above, the position sensor 1103 is connected to the DVS 115 and the image sensor 120. The purpose of the position sensor 1103 is to determine the position (that is the geographic position, attitude, speed and/or orientation) of the DVS 115 and the image sensor 120 when capturing an image. In other words, the position sensor 1103 determines the position of the DVS 115 and the image sensor 120 between consecutive captured images. The positon of the DVS 115 and the image sensor 120 for each captured image is provided to the processing circuitry 1102. The processing circuitry 1102 therefore determines the change in position of the DVS 115 and the image sensor 120 between consecutive captured images. This allows the movement of the DVS 115 and image sensor 120 to be determined by the processing circuitry 1102.

As the image captured by the DVS 115 and image sensor 120 will be subject to the same movement as that experienced by the DVS 115 and image sensor 120, the processing circuitry 1102 compares the movement of the DVS 115 and image sensor 120 with any movement of one or more subject within the image captured by the DVS 115 and image sensor 120 respectively.

In the event that the movement of one or more subject within the image captured by the DVS 115 and the image sensor 120 is greater than the amount of movement of the DVS 115 and the image sensor 120 detected by the position sensor 1103, then the processing circuitry 1102 determines that the subject in the captured image is moving.

In other instances, although the one or more subjects in the image may be moving, the amount of movement of the one or more subject within the image captured by the DVS 115 and the image sensor 120 may be less than the amount of movement of the DVS 115 and the image sensor 120 detected by the position sensor 1103. So, in embodiments, in the event that the determined movement of the image sensor 120 and the dynamic vision sensor 115 is different to the movement determined from the image received from the dynamic vision sensor, the processing circuitry 1102 determines that the movement of the DVS 115 and the image sensor 120 causes the subject in the captured image to appear to be moving. In the instance that the movement of the DVS 115 and the image sensor 120 causes the apparent movement in the captured image, no image is output to the neural network. This reduces the likelihood of an incorrect decision being made by the neural network. Of course, the disclosure is not so limited and in embodiments, the instance that the movement of the DVS 115 and the image sensor 120 causes the apparent movement in the captured image, the same level of compression is applied to the entire image.

Accordingly, the processing circuitry 1102 in embodiments, determines that a subject within an image captured by the image sensor 120 is moving when the amount of movement of the subject within consecutive images is different to that determined by the processing circuitry 1102. This allows the system 100 (and especially the DVS 115 and the image sensor 120 of the system 100) to be mounted on a moving object such as a vehicle.

Although the foregoing describes using the position sensor 1103 to determine that detected movement is due to the movement of the system 100, the disclosure is not so limited. In embodiments, the movement of the entire image captured by the DVS 115 and the image sensor 120 would also indicate that the detected movement is due to the movement of the DVS 115 and the image sensor 120. In other words, if the entire image moves (rather than a part of the image), this is likely due to the movement of the DVS 115 and the image sensor 120 rather than the subject in the image.

Figure 5:
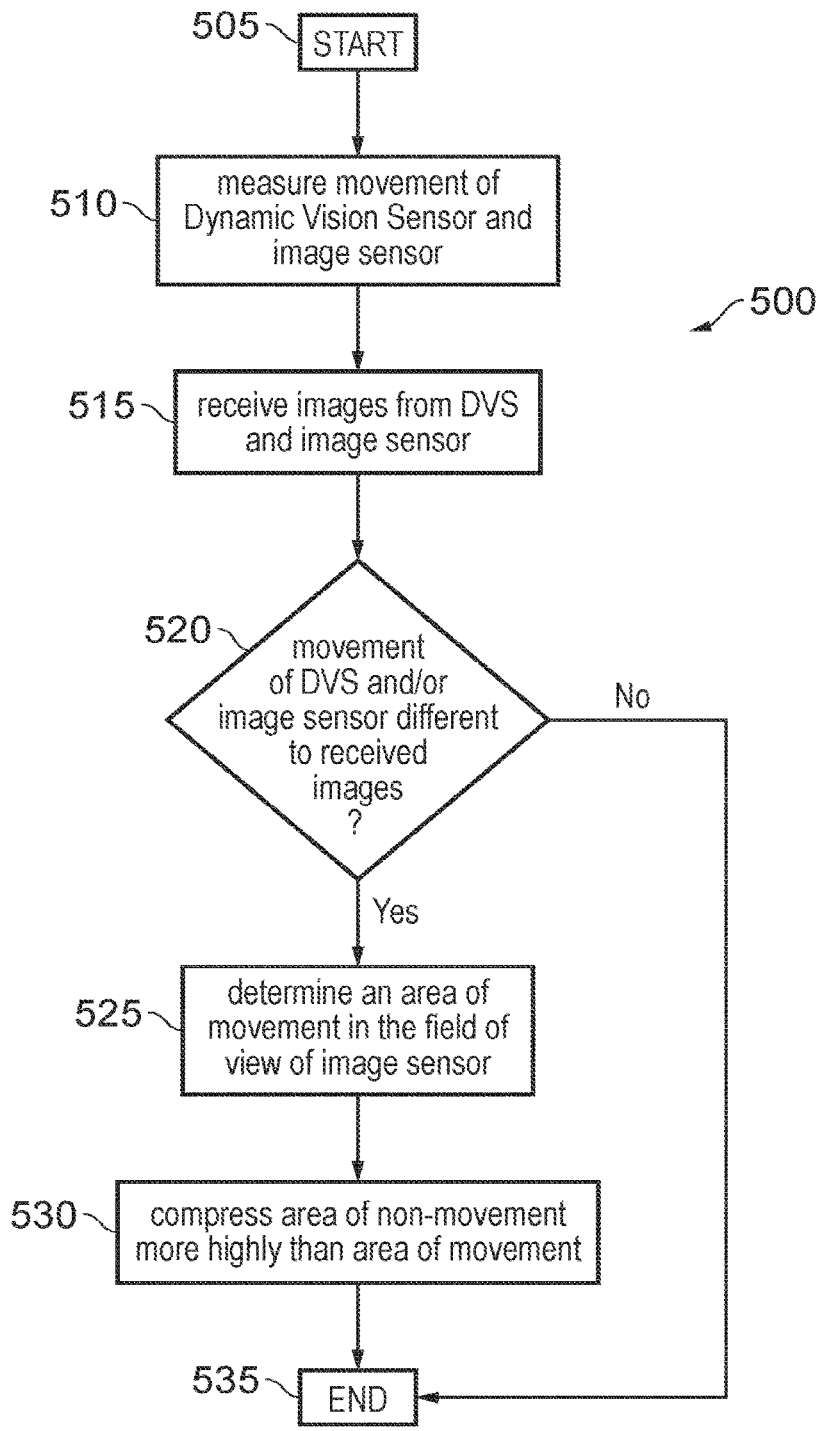
FIG. 5 shows a process according to embodiments of the disclosure.

Referring to FIG. 5, embodiments of the disclosure are shown. Specifically, FIG. 5 describes a flow chart 500 explaining the method performed by the processing circuitry 1102 according to embodiments of the disclosure.

The process starts at step 505. The process then moves to step 510 where the movement of the DVS 115 and image sensor 120 is determined by the processing circuitry 1102. This is determined from the position information provided by the position sensor 1103.

The process then moves to step 515 where the processing circuitry 1102 receives the images captured by the DVS 115 and the image sensor 120. The process moves to step 520 where the processing circuitry 1102 compares the movement of the subject or subjects within the image captured by the image sensor 120 with the movement of the DVS 115 and/or the image sensor 120 determined in step 510. In the event that the movement is not different, the "no" path is followed to step 535 where the process ends. However, in the event that the movement is different, the "yes" path is followed to step 525.

In step 525, the processing circuitry 1102 determines an area of movement in the field of view of the image captured by the image sensor 120. The process then moves to step 530 where the processing circuitry 1102 applies a higher level of image compression to the areas of no movement compared with the area of movement in the image from the image sensor.

It should be noted that step 510 and step 520 are optional and used in embodiments of the disclosure.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A method comprising:
    receiving a first image data from a dynamic vision sensor and a second image data from an image sensor, wherein the dynamic vision sensor and the image sensor capture images having an overlapping field of view;
    determining, from at least the first image data received from the dynamic vision sensor and at least the second image data from the image sensor, an area of movement within the first and second image data;
    applying image compression to the first and second image data based on the area of movement to produce a processed image; and
    outputting the processed image to a neural network.

2. The method according to claim 1, comprising:
    receiving a plurality of positions defining the area of movement from the dynamic vision sensor.

3. The method according to claim 2, wherein the plurality of positions are pixel positions.

4. The method according to claim 2, wherein the plurality of positions define corners of the area of movement.

5. The method according to claim 1, wherein an amount of image compression is determined in accordance with the amount of movement within the area.

6. The method according to claim 1, wherein the dynamic vision sensor and the image sensor are integrated into a single sensor.

7. The method according to claim 1, wherein the applying image compression based on areas of movement to produce the processed image includes applying a higher level of compression to areas of non-movement.

8. The method according to claim 1, wherein the determining the area of movement includes determining a relative movement between the dynamic vision sensor and the image sensor and a detected object.

9. The method according to claim 8, further comprising applying the image compression based on the determined relative movement.

10. A non-transitory computer-readable storage medium storing computer readable instructions which, when loaded onto a computer, configure the computer to perform the method according to claim 1.

11. An apparatus comprising:
    circuitry configured to:
    receive a first image data from a dynamic vision sensor and a second image data from an image sensor, wherein the dynamic vision sensor and the image sensor capture images having an overlapping field of view,
    determine, from at least the first image data received from the dynamic vision sensor and at least the second image data from the image sensor, an area of movement within the first and second image data,
    apply image compression to the first and second image data based on the area of movement to produce a processed image, and
    output the processed image to a neural network.

12. The apparatus according to claim 11, wherein the circuitry is further configured to:
    receive a plurality of positions defining the area of movement from the dynamic vision sensor.

13. The apparatus according to claim 12, wherein the plurality of positions are pixel positions.

14. The apparatus according to claim 12, wherein the plurality of positions define corners of the area of movement.

15. The apparatus according to claim 11, wherein an amount of image compression is determined in accordance with an amount of movement within the area.

16. The apparatus according to claim 11, wherein the dynamic vision sensor and the image sensor are integrated into a single sensor.

17. The apparatus according to claim 11, wherein the circuitry is further configured to apply image compression based on areas of movement to produce the processed image by being further configured to apply a higher level of compression to areas of non-movement.

18. The apparatus according to claim 11, wherein the circuitry is further configured to determine the area of movement by being further configured to determine a relative movement between the dynamic vision sensor and the image sensor and a detected object.

19. The apparatus according to claim 18, wherein the circuitry is further configured to apply the image compression based on the determined relative movement.

20. An apparatus comprising:
    a dynamic vision sensor;
    an image sensor; and
    circuitry configured to:
    receive a first image data from the dynamic vision sensor and a second image data from the image sensor, wherein the dynamic vision sensor and the image sensor capture images having an overlapping field of view,
    determine, from at least the first image data received from the dynamic vision sensor and at least the second image data from the image sensor, an area of movement within the first and second image data,
    apply image compression to the first and second image data based on the area of movement to produce a processed image, and
    output the processed image to a neural network.

* * * * *